United States Patent Office 3,511,039
Patented May 12, 1970

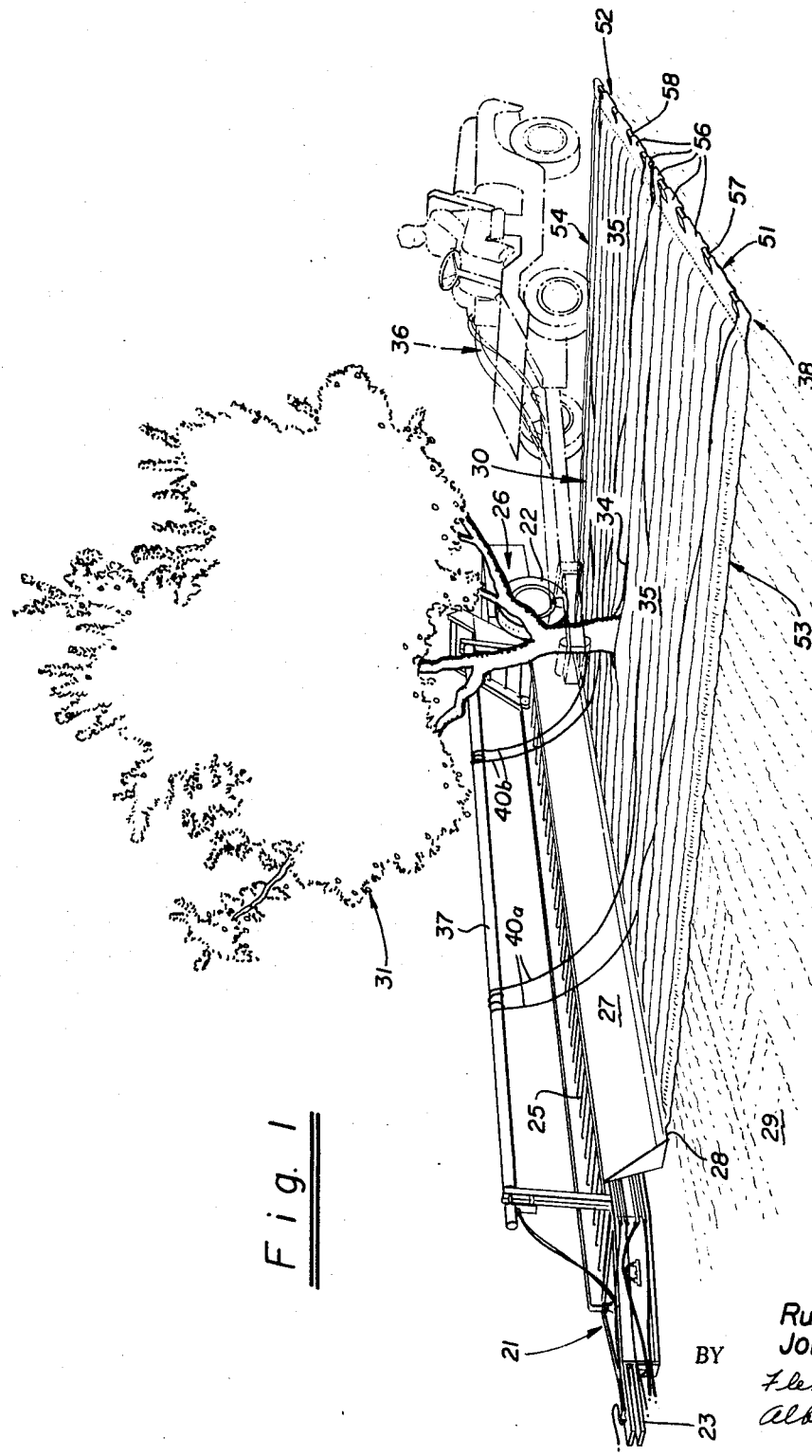

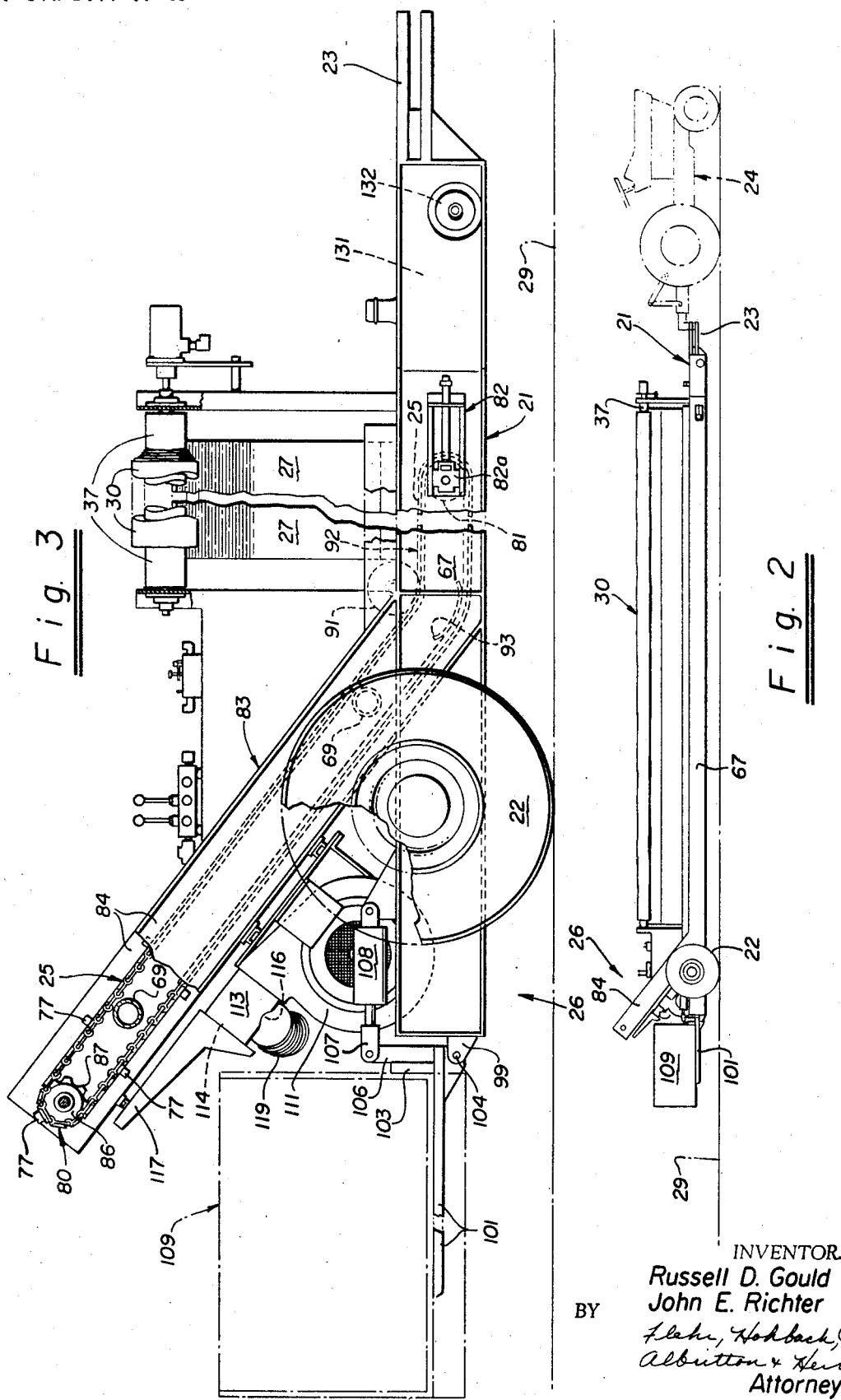

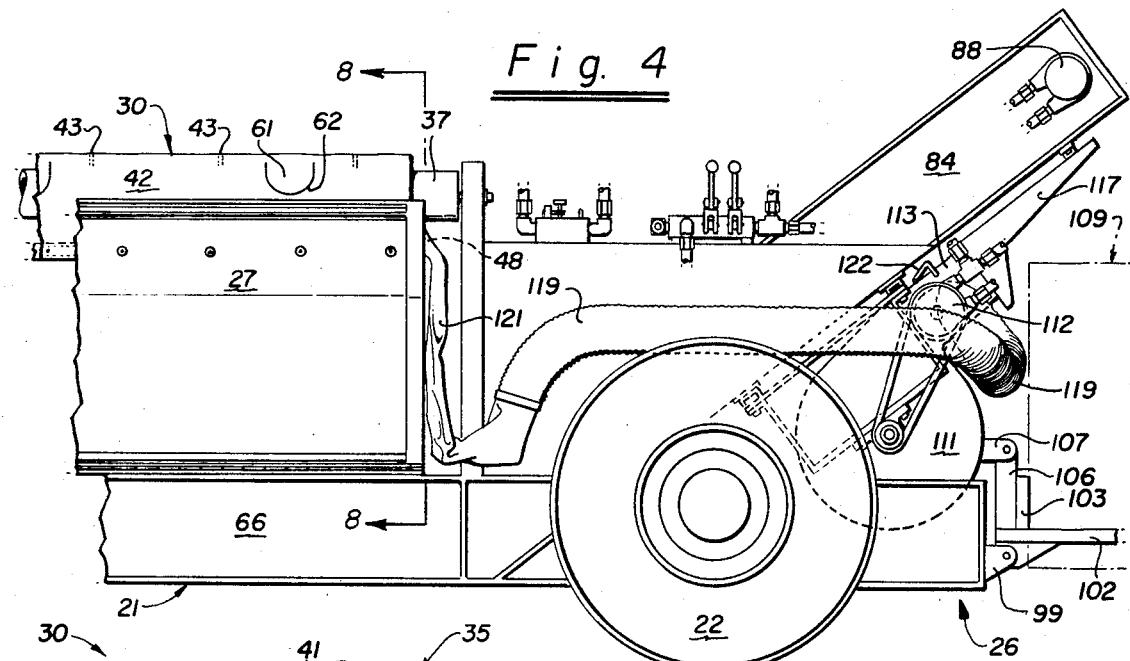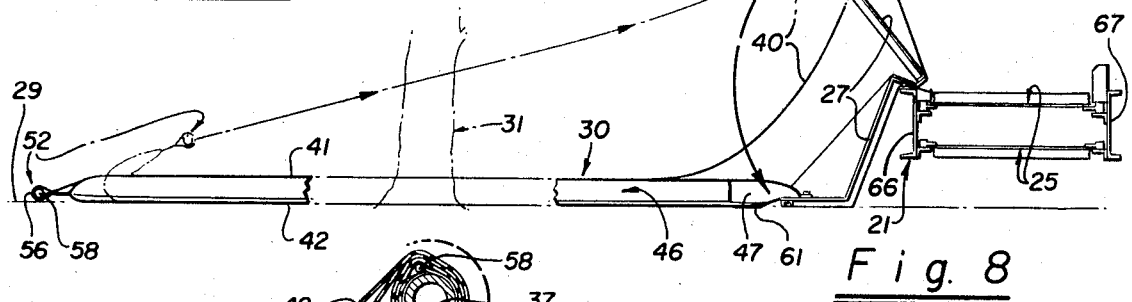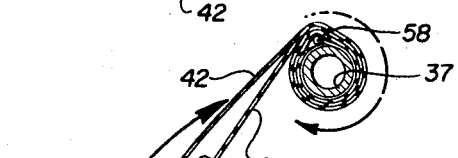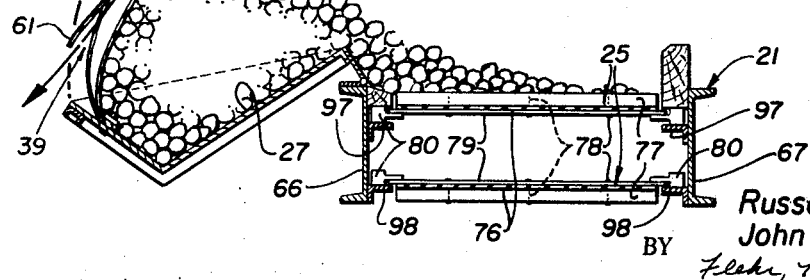

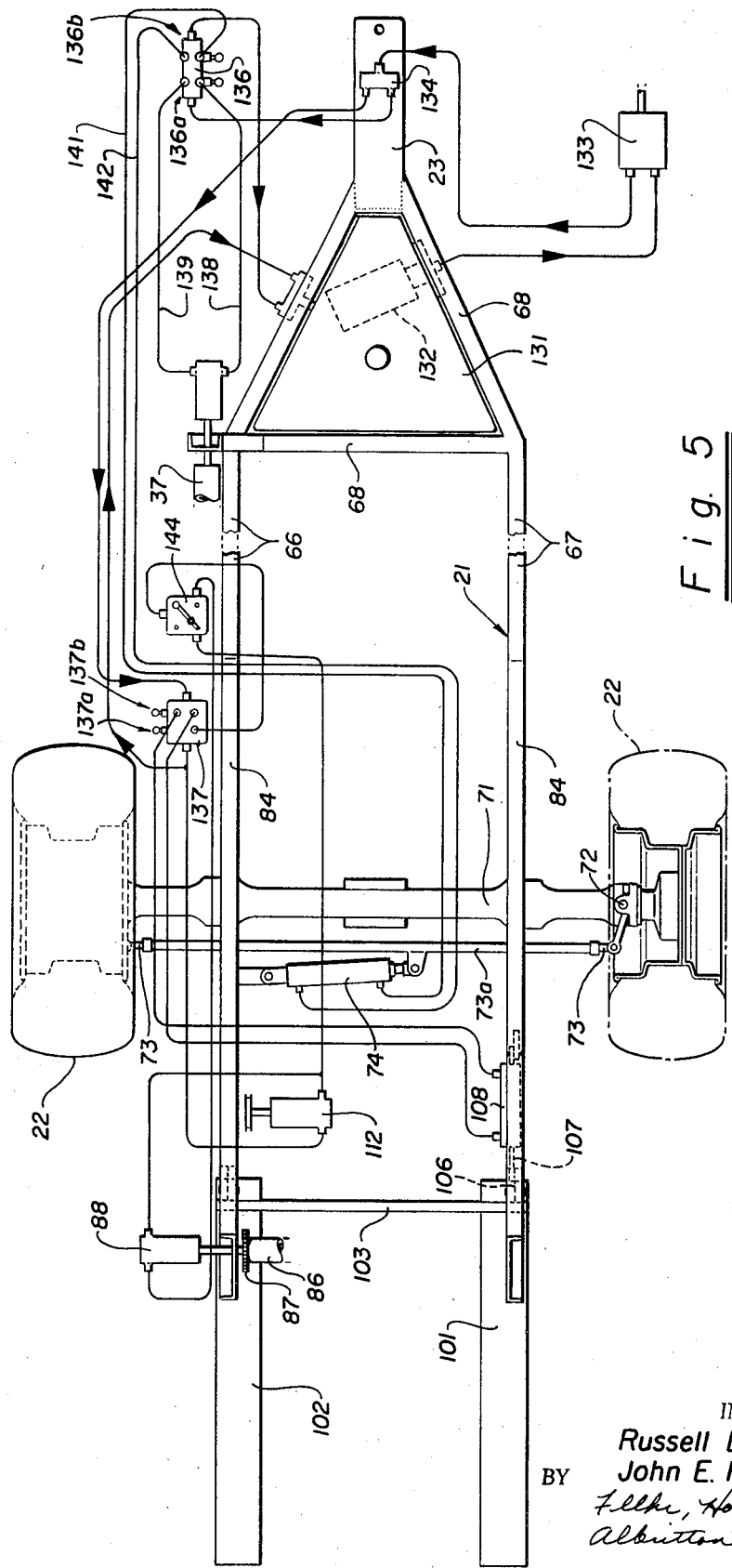

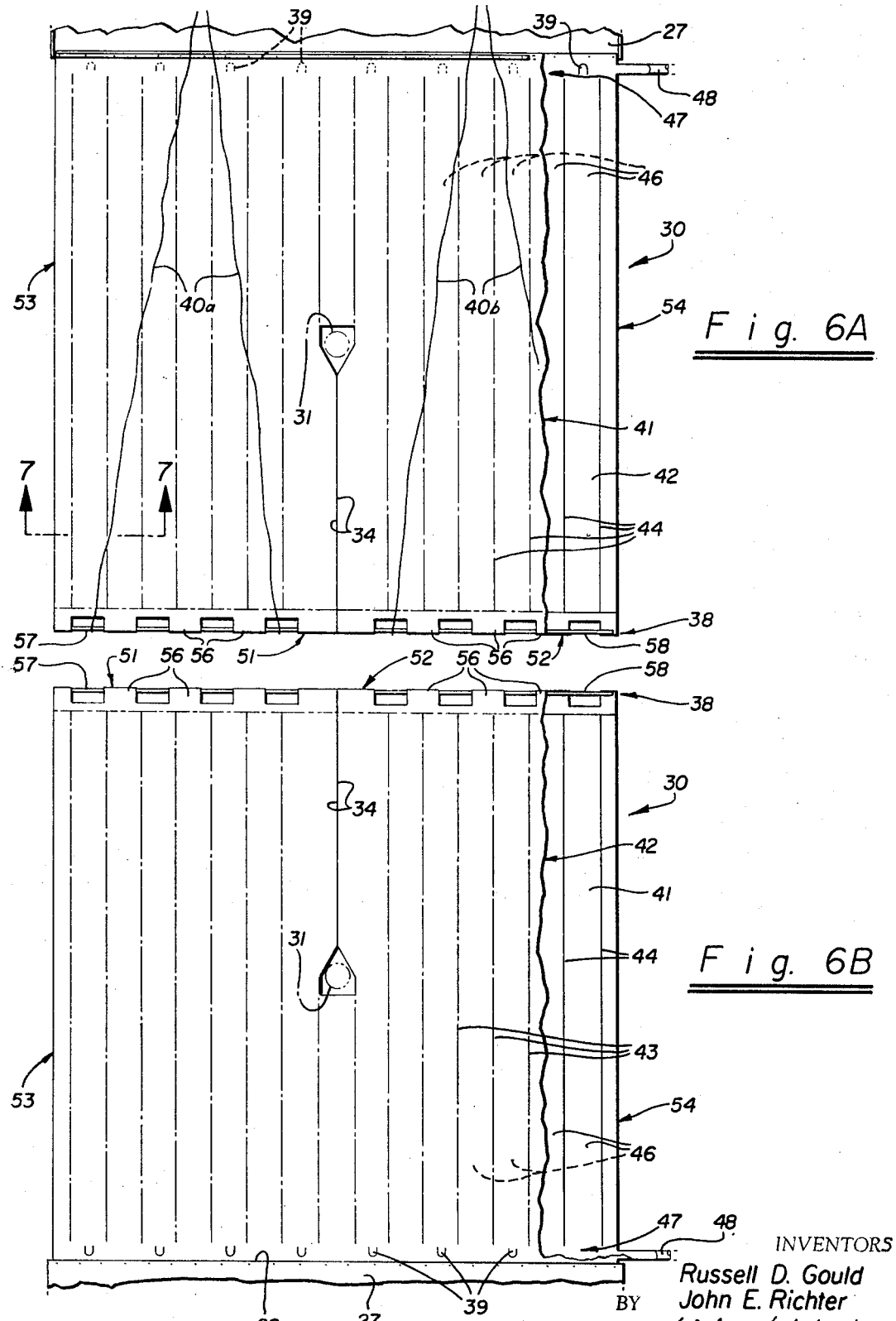

3,511,039
METHOD AND APPARATUS FOR CATCHING FRUIT
Russell D. Gould, San Jose, and John E. Richter, Santa Clara, Calif. (both of P.O. Box 26, Milpitas, Calif. 95035)
Filed Dec. 5, 1966, Ser. No. 599,132
Int. Cl. A01g *19/00*
U.S. Cl. 56—329                  12 Claims

ABSTRACT OF THE DISCLOSURE

A tree shaker including an elongate mobile frame having a fruit conveyor for collecting fruit and delivering it to a collection box at one end thereof. An inflatable air cushion is fastened to the frame on one side and adapted to be extended under a tree where it is partially inflated. A roll is mounted above the frame and is connected to the remote side of the air cushion by ropes so that the air cushion can be reeled in and rolled up in compact form on the roll. Simultaneously, air within the cushion is expelled through vent flaps and fruit is shifted to the frame conveyor for collection.

---

This invention relates to a method and apparatus for catching fruit shaken from trees, sometimes called catching frames, and in particular to such apparatus utilizing a collapsible ground supported air cushion as the catching element.

Fruit catchers are commonly used in fruit harvesting operations employing mechanical tree shakers. While various types of fruit catchers are presently in use, all serving to more or less cushion the fall and thereby avoid bruising and damage to the fruit, none has proved to be entirely successful. Catching apparatus most commonly used employs flexible sheets resiliently suspended in frames above the ground. Such supporting apparatus and frames have been costly to build and maintain and have been cumbersome and time consuming to handle. There is therefore a need for a new and improved apparatus for catching fruit.

In general, it is an object of the present invention to provide a new and improved method and apparatus for catching fruit, employing rapidly inflated and deflated air cushions, which will overcome the above-mentioned limitations and disadvantages.

Another object of the invention is to provide a method and apparatus of the above character by which harvested fruit can be removed from under the tree simultaneously with the operation of recovering the catching apparatus.

Another object of the invention is to provide an apparatus for catching fruit of the above character which does not require bulky, cumbersome support structure, but instead uses alternately inflatable and collapsible air cushions that are easily handled and stored.

Another object of the invention is to provide an apparatus for catching fruit of the above character which is in the form of a single unit adapted to travel along a row of trees and to rapidly collect the fruit shaken off each tree.

Another object of the invention is to provide an apparatus of the above character which is relatively simple to operate and economical to manufacture.

These and other objects of the invention will appear from the following description and claims when taken in conjunction with the accompanying drawings.

Referring to the drawings:

FIG. 1 is a perspective view of apparatus for catching fruit constructed according to the invention and showing the collapsible air cushion thereof in extended position under a tree.

FIG. 2 is a side elevational view of the apparatus of FIG. 1 showing the air cushion collapsed and rolled up onto the apparatus.

FIG. 3 is an enlarged side elevational view of the apparatus of FIG. 2, with certain parts broken away.

FIG. 4 is an enlarged side elevational view of the opposite side of the apparatus, with cetrain parts broken away.

FIG. 5 is a plan view of the frame and supporting structure of the apparatus and showing in particular the associated hydraulic power and control mechanisms.

FIG. 6A is a top plan view, partially broken away, of the inflatable air cushion of the apparatus shown in FIG. 1.

FIG. 6B is a bottom plan view, partially broken away, of the inflatable air cushion of the apparatus shown in FIG. 1.

FIG. 7 is a sectional view of the inflatable air cushion of the apparatus taken along the lines 7—7 of FIG. 6A.

FIG. 8 is a sectional view of the apparatus of FIG. 4 taken along the lines 8—8, and also shows air cushion of the apparatus in the extended position and in the collapsed position.

FIG. 9 is a sectional view of the apparatus, similar to that shown in FIG. 8, and depicts the partially deflated air cushion being rolled up, the fruit thereon being shifted along for collection.

Referring to the figures, the fruit catching apparatus of the invention includes a towable frame 21 supported at one end on wheels 22 and at the other end by a hitch 23 welded to the frame and adapted to be attached to a towing vehicle, such as a tractor 24. Frame 21 carries draper 25 which serves to convey fruit dumped thereon to one end 26 of the apparatus where it is binned. An elongate dump plate 27 is hinged to one side of frame 21 for movement between a raised position and a lowered position (FIG. 8). In the lowered position the outer edge 28 of the plate 27 lies at ground level 29.

A rapidly inflatable-deflatable air cushion 30 is fastened to the outer edge 28 of dump plate 27 which serves to position the cushion and permit it to be placed on the ground about tree 31. Cushion 30 is large enough to extend a substantial distance laterally away from plate 26 and to cover the area beneath tree 31. As it is extended, cushion 30 lies on the ground and is easily positioned underneath the tree, the latter passing through a slot 34 in the cushion. When so extended, the cushion 30 is inflated, preferably only partially, so that it presents an upwardly facing air supported surface 35 for catching fruit shaken out of the tree, as by a tree shaker 36 (for example, as disclosed in our copending application, Ser. No. 519,177, now Pat. 3,457,712 filed Jan. 6, 1966). The impact of the falling fruit is softly counteracted by the contained air within the cushion 30 so that the fruit is not bruised.

A roll 37 is horizontally mounted above the frame in spaced relation above the dump plate 27. After the fruit drops and is caught, the outer end 38 of the cushion 30 is reeled in by ropes 40a, 40b connecting the outer end to the roll 37, and the cushion is rolled up onto the roll 37, starting from end 38. As the cushion is rolled up and recovered, the fruit is carried and shifted along to the dump plate 27, at which point the latter is raised (FIG. 8, 9) to dump the fruit onto the draper 25. Simultaneously, the air within the cushion is expelled through vents 39 on the underside of the cushion so that the cushion is progressively collapsed as it is rolled up. When the collapsed cushion has been completely recovered, the apparatus is in a compact form ready to be moved to another tree, or to storage.

INFLATABLE AIR CUSHION

Referring to FIGS. 1, 4, 6A, 6B, 7, 8 and 9, the inflatable air cushion of the invention is shown in detail. The air cushion 30 comprises upper and lower flexible walls 41, 42 interconnected along spaced parallel seams 43. To gain greater but limited depth (i.e., dimension between walls 41, 42), a series of folds 44 are formed in the upper wall 41 and joined to the lower wall at the seams 43. If desired, folds 44 can be replaced by continuous strips of flexible material interconnected between the upper and lower walls. In either case, the seams 43 and the upper and lower walls 41, 42 form a series of parallel elongate air passages 46 within the cushion. All walls of the cushion can be constructed of cloth-reinforced rubberized sheeting.

The cushion 30 is attached to the plate 27 so that the seams 43 and passages 46 extend away from and generally transversely of the long dimension of plate 27. Each of seams 43 terminates in spaced relation to edge 28 of the plate to form therebetween a plenum 47 communicating with each of passages 46. An inlet 48 passes into the plenum 47 adjacent end 26 of the apparatus and serves to connect the cushion with a source of air under pressure as hereinafter described.

The borders 51, 52, 53, 54 of the cushion and the border of slot 34 are closed and sealed as by being sewn or otherwise sealed off. Loops 56 are formed along sides 51, 52 for receiving elongate rigid members 57, 58 which facilitate manual handling and positioning of cushion 30.

Vents 39 permit air to pass out of the cushion 30 and comprise semicircular flaps 61 formed in the lower wall 42 preferably along the underneath of inlet plenum 47. Such flaps 61 can take various forms but they are preferably made by curved, generally semicircular slits 62 in the lower wall 42. Each slit 62 is cut so that the flap 61 formed thereby opens toward plate 27. Thus, as the cushion is rolled up from end 38, the contained air is simultaneously expelled through the flaps, permitting the cushion to collapse so that it can be rolled into compact form (FIG. 9).

DRAPER AND FRAME

Frame 21 includes elongate side members 66 and 67 supported at the front by a transverse frame member 68, along the length by transverse members 69, and at the rear by an axle 71, each of which is welded to the members 66 and 67. Axle 71 carries wheels 22 on spindles (not shown) rotatably mounted on kingpins 72. The direction taken by wheels 22 is controlled by an equal crank steering linkage 73 including a steering link 73a. A hydraulic actuator 74 is connected between steering link 73a and member 66 to provide full power steering and facilitate positioning of the apparatus.

Draper 25 is mounted within the framework and consists of an endless belt 76 having spaced bars or lugs 77 secured to its outwardly facing surface by fasteners 78 passing through the bars 77 and belt 76 and secured to reinforcing strips 79 on its inner surface. Each side of belt 76 is provided with conveyor drive chains 80 secured to the strips 79.

A roller and sprocket assembly 81 is rotatably mounted in sliding blocks 82a which are part of a take-up frame 82 carried between members 66 and 67 at one end of frame 21. At the other end of frame 21 there is provided a riser frame 83 which forms an upwardly branching inclined extension of frame 21 overlying that end. Riser frame 83 includes supporting members 84 transversely secured therein. A roller 86 having sprockets 87 at each end is mounted at the upper end of riser frame 83 and is driven by a hydraulic motor 88. Belt 76 and the associated chains 80 are wound about roller 86 and the associated sprockets 87 so that the conveyor belt is in driving relationship therewith. The change in direction of the belt at the bottom of riser frame 83 is maintained by idler wheels 91 mounted on each side of the frame and over the upper run 92 of the belt and further by guide plates 93 mounted over the bottom run of the belt, as shown. As particularly shown in FIGS. 8 and 9, the chains 80 are supported for sliding motion along the length of the frame 21 on angles 97 and 98 secured along the inside of frame members 66 and 67.

Each of the side members 66 and 67 at the end of frame 21 beneath riser frame 83 carries rearwardly extending brackets 99. A pair of forks 101, 102 rigidly connected together by a member 103 is rotatably mounted into brackets 99 on pins 104. A lever 106 affixed to fork 101 is operatively connected to an arm 107 of a hydraulic linear actuator 108 mounted to the side frame member 67. As arm 107 is retracted, the forks 101, 102 are tilted upwardly to a generally horizontal position and serve to support a fruit receiving bin 109. When arm 107 is extended, forks 101, 102 are tilted backward and downwardly to permit bin 109 to slide off the apparatus and onto the ground.

AIR SUPPLY

Referring now to FIGS. 3 and 4, a blower 111 driven by a hydraulic motor 112, is mounted to the underside of riser frame 83. The output of blower 111 is received by distribution in chamber 113 having two output openings 114 and 116. The chamber 113 contains a flap valve (not shown) which in one position directs the output of the blower upwardly through opening 114 and through a discharge nozzle 117 aimed across the path of the fruit as the latter drops off of the upper run 92 of the draper 25. In its other position, the flap valve directs the output through opening 116 and into a large diameter air duct 119 which is connected through a flexible duct 121 to the inlet 48 of air cushion 30 (FIGS. 4 and 6). The position of the flap valve is controlled directly by lever 122 connected thereto and accessible on that side of the apparatus adjacent other control levers (FIG. 4).

HYDRAULIC POWER AND CONTROL CIRCUIT

The various actuators and motors hereinbefore described are powered from a single source of hydraulic fluid under pressure. Thus, a reservoir 131 of fluid is located at the front of the apparatus in the triangular section between support member 68 and the hitch 23. A filter 132 is located inside the reservoir 131 and its output is connected to a pump 133 which is located on the towing vehicle and is driven by suitable means thereon. Pump 133 supplies hydraulic fluid under pressure to a flow divider 134 from which the fluid passes to roller winding and steering control valve 136 and to draper, blower, and fork tilt control valve 137.

Valve 136 has two independent sections 136a, 136b, each of which is a three position valve of the type which permits high pressure to be supplied on either line connected thereto and which also possess a neutral position. Section 136a sends high pressure fluid through either of lines 138, 139 to the windup hydraulic motor of roller 37, the other of lines 138, 139 being a fluid return. The other section 136b supplies high pressure fluid to either of lines 141, 142 to the power steering actuator 74. For convenience, valve 136 is mounted on the towing vehicle so that the steering of the apparatus and windup of roller 37 can be easily and conveniently controlled by the driver.

The other output of the flow divider 134 is directed to valve 137 mounted near the rear of the apparatus and over the wheels 122. Valve 137 is divided into two sections, 137a, 137b, each of which is an independent three position reversing valve. section 137a is connected through a continuously variable flow control 144 to the conveyor belt hydraulic drive motor 88 and the blower motor 112. Section 137b of valve 108 is connected to linear actuator 67 which operates the fork lift lever 106.

OPERATION

The operation of the above-described apparatus is as follows. The apparatus as depicted in FIG. 1 is towed into position adjacent a tree 31 to be shaken, the positioning being facilitated by manipulation of the control valve 136b, and the associated power steering unit 73, 74 on the apparatus. When positioned, control 136a is actuated to turn the windup motor in reverse and unreel the collapsed air cushion 30 off of roll 37. Thus, as shown in FIG. 8, the dump plate 27 first drops downwardly and into contact with the ground, and thereafter the deflated cushion is rolled out, its position being determined by the drump plate. The cushion is manually pulled out under the tree by manipulating the same by ribs 57 until the cushion is fully stretched out underneath the tree, the latter having passed along slot 34 to a central position with respect to the cushion. The cushion can be simultaneously inflated as it is unrolled from the roller and dropped to the ground, or can be inflated after it is positioned. The cushion is inflated by actuating control valve 137a to power the blower 111 and by moving the flap valve 122 into a position so that air is blown through duct 119 and into cushion 30. Simultaneously with this operation, which normally takes about 5 to 20 seconds, a tree shaker is moved into position and operatively engages the tree for shaking.

In inflating the cushion it is found that a partial inflation to a low pressure is preferred so that the impact of the fruit falling thereon is gently absorbed. The limit of such partial inflation is that sufficient to support the upper wall 41 at a position slightly less than full distention. Thus, in inflating the cushion means, the initial development of pressure within it is due to the weight of the upper wall and remains small and nearly constant. But as the amount of air is increased the upper wall reaches a relatively maximum distention (assuming stretching effects to be minimal) after which the resistance of the means fixing the maximum distention (seams 43) causes the internal pressure to rise rapidly. By partial inflation, then, is meant an amount of air sufficient to support the upper wall at nearly completely distended position but less than that which would develop a substantial pressure greater than that required to support the weight of upper wall 41. Amounts of air somewhat more or less than this are also satisfactory.

When the cushion has become inflated the tree is shaken, dumping the fruit onto the cushion 30. The fruit drops in a surprisingly short time, usually less than a few (about 5) seconds. The inflated or partially inflated cushion 30 nevertheless acts to absorb and to counteract the effect of this rapid fruit drop, apparently by a combination of several mechanisms, including compression of the air; the creation of shock waves travelling back and forth in the cushion; the momentary expulsion of air through the vents 39 and back through supply ducts 121, 119 and blower 111, and possibly others. Whatever the nature of the counteracting mechanisms, it is found that the fruit collected with the apparatus of the invention is not bruised or damaged, but is comparable in condition to that of hand picked fruit.

During the time the tree is being shaken, the air supply may be shut off by turning the flap valve 122 so as to discharge air out through the nozzle 117. The cushion then gradually deflates by leakage through vents 39 under the weight of the fruit. After the fruit is caught, the cushion 30 is reeled in by ropes 39 and 41 and wound up on roll 37 starting from end 38. In so doing, the remaining air contained within the cushion is squeezed toward the vents 39 and the fruit is simultaneously rolled along the cushion toward dump plate 27 (FIG. 9). As the last air is squeezed out through vents 39, and the cushion is nearly completely wound on roll 37, the dump plate 27 is lifted up toward the roll 37 and the fruit is dumped onto the draper, as shown. Thus, by a simple, efficient and exceptionally rapid sequence of operations, (requiring all together no more than about 20 to 50 seconds), an exceedingly effective fruit harvesting operation is accomplished by the apparatus of the invention.

After the fruit is dumped onto the draper the unit is immediately ready to proceed on to the next tree. Meanwhile, the draper 24 is started with control valve 137b, the fruit being conveyed thereby to the rear of the apparatus and up the inclined riser frame 83 from which is drops into bin 109, and passes through the debris removing air blast from nozzle 117. Whenever bin 109 is filled with fruit and forks 101, 102 are tilted by operating control valve 137b and the bin is easily slid backwards onto the ground for later pickup and another bin is slid onto the forks and raised.

Thus, there has been provided a new and improved method and apparatus for catching fruit which is especially effective in cushioning its impact of fall. Moreover, the apparatus is simple and rapid in operation and provides complete fruit catching facility in a single, easily collapsed unit. Many modifications and adaptations of the invention will occur to those skilled in the art to which this invention pertains without departing from the spirit and scope of the invention. It should be understood therefore that the disclosure and description of apparatus herein are illustrative of the invention and are not to be taken as a limitation thereon.

We claim:

1. In fruit catching apparatus for receiving fruit shaken from a tree, a frame including means for receiving fruit dumped therein, a support roll, said frame including means for mounting said roll above said frame in an elevated position with respect to the means for receiving fruit therein, inflatable air cushion means constructed of a flexible planar sheet material, means interconnecting one side of said air cushion means to the frame, means connecting the roll to portions of the cushion means remote from the side thereof connected to said frame whereby said roll can be collapsed and rolled into a compact form upon said roll from the remote portions thereof, said cushion means having interconnected upper and lower flexible walls extending over an area approximately as large as the area beneath the tree, means connecting said inflatable air cushion means to the frame in such fashion as to permit said air cushion means to be extended about the tree with its lower wall in contact with the ground and its upper wall facing upwardly to receive and cushion the impact of fruit falling from the tree, and means forming an inlet in said cushion means for permitting air to be blown into the cushion means, the air serving to expand and support said upper wall in spaced relation with respect to said lower ground supported wall.

2. Fruit catching apparatus as in claim 1 wherein said inflatable air cushion means is constructed as a unitary structure having a slot running from one side thereof to a position near the center of the cushion means to facilitate placing the cushion means on the ground about the tree.

3. Fruit catching apparatus as in claim 1 wherein said cushion means is provided with a plurality of air vents, said air vents being located in the lower wall of the cushion means so that they are normally closed by contact with the ground when said cushion means is extended.

4. Fruit catching apparatus as in claim 1 wherein said upper and lower walls are interconnected by spaced parallel seams to form parallel air passages therein, said seams terminating at a region communicating with each of said passageways to form an air plenum at said region, said air inlet being located in communication with said plenum.

5. Fruit catching apparatus as in claim 4 wherein a plurality of air vents are located in the lower wall and along said plenum.

6. Apparatus as in claim 1 wherein said cushion means is provided with a plurality of vents in its lower wall adjacent said means connecting the cushion means to the frame, whereby enclosed air can be expelled through said vents and the cushion means collapsed as it is rolled onto said roll.

7. Apparatus as in claim 1 further including a blower mounted on said frame, and means for selectively connecting and disconnecting the blower to said air cushion means.

8. In fruit catching apparatus for receiving fruit shaken from a tree, a frame, means for supporting the frame for movement over the ground, means mounted in the frame to receive fruit, inflatable air cushion means having upper and lower flexible walls extending over an area approximately as large as the area beneath the tree, said upper and lower walls being interconnected at spaced portions thereof and sealed about the perimeter so that when inflated said walls lie in generally spaced horizontal planes, means connecting said inflatable air cushion means to the frame in such fashion as to permit the air cushion means to be extended and placed on the ground about a tree with the lower wall thereof in supporting contact with the ground and with the upper wall thereof being supported by the air within the inflated cushion means, said upper wall facing upwardly to receive and cushion the impact of fruit falling thereon, means forming an air inlet in said cushion means, a source of air under pressure, means for selectively connecting said source of air under pressure to said inlet, a roll, said frame including means rotatably mounting said roll in spaced relation above said means connecting the cushion means to the frame, rope means connecting the side of said air cushion away from the frame to the roll, said roll serving as a support on which said cushion means can be rolled with the aid of said rope means, said cushion means having a plurality of vents in said lower wall alongside said means connecting the cushion means to the frame, so that, as the cushion means is unrolled and air applied by the means selectively connecting the source of air to the inlet, the normally closed vents in contact with the ground serve to maintain the air within said cushion means until the same becomes at least partially inflated, whereby, on completion of the fruit catching operation, said vents also serve to permit air to escape from the cushion means as portions of the cushion means remote from the frame are pulled in and rolled about said roll in a recovery operation.

9. Fruit catching apparatus as in claim 11 wherein said vents are formed by a plurality of arcuate slits cut in the lower wall of said cushion means.

10. In fruit catching apparatus for receiving fruit shaken from a tree, a frame, inflatable air cushion means constructed to lie on the ground, said cushion means having interconnected upper and lower flexible walls extending over an area approximately as large as the area beneath the tree, means connecting said inflatable air cushion means to the frame in such fashion as to permit said air cushion means to be extended about the tree with its lower wall in contact with the ground and its upper wall facing upwardly to receive and cushion the impact of fruit falling upwardly to receive and cushion the impact of fruit falling from the tree, means forming an inlet in said cushion means for permitting air to be blown into the cushion means, the air serving to expand and support said upper wall in spaced relation with respect to said lower ground supported wall, fruit receiving means mounted within said frame, said means connecting said cushion means to the frame including a dump plate, means rotatably connecting said dump plate to the frame for movement between a first, lowered position wherein those portions of said dump plate that are removed from the frame are at ground level, and a second, raised position for dumping fruit onto said fruit receiving means, and means connecting said cushion means to the portions of the dump plate removed from the frame.

11. A method for mechanically harvesting fruit utilizing collapsible air cushion means which is normally rolled up, comprising the steps of unrolling said cushion means and extending it out beneath a tree, and lowering said cushion means into contact with the ground whereby the same is supported in generally horizontal plane, partially inflating the cushion means to a low pressure at which the amount of contained air is about that which is slightly less than sufficient to support the cushion in a distended form and less than that required to fully inflate and develop a substantial pressure in the same, shaking the tree so that fruit falls onto the partially inflated cushion means, absorbing and counteracting the impact of the fruits by the action of the air contained within said cushion means, deflating the cushion means while the fruit remains thereon, and rerolling the cushion means into compact form from one end thereof to thereby simultaneously shift the fruit thereon to one end thereof for collection by using the cushion means as a fruit conveyor as the cushion means is rolled up.

12. A method as in claim 11 in which the cushion means is rolled from the end remote from the frame whereby said cushion forms a closed loop, the lower portion extending from the frame outwardly under the tree and other portions returning upwardly to the point of being rolled up, whereby fruit is shifted toward the frame by the action of the cushion means in being rolled up.

References Cited
UNITED STATES PATENTS

| | | | |
|---|---|---|---|
| 389,697 | 9/1888 | Fleming | 56—329 |
| 1,317,235 | 9/1919 | Stonebridge | 5—348 |
| 2,473,327 | 6/1949 | Born | 56—329 |
| 3,080,698 | 3/1963 | Beckman | 56—328 |
| 3,250,065 | 5/1966 | Frost | 56—329 |
| 3,310,818 | 3/1967 | Fischer | 182—139 X |
| 3,339,309 | 9/1967 | Stone | 5—349 X |
| 3,347,032 | 10/1967 | Pool et al. | 56—329 |
| 3,399,407 | 9/1968 | Olsen | 56—329 |

RUSSELL R. KINSEY, Primary Examiner

U.S. Cl. X.R.

5—348